US009726929B2

(12) United States Patent
Kawazu et al.

(10) Patent No.: US 9,726,929 B2
(45) Date of Patent: Aug. 8, 2017

(54) WIRE GRID POLARIZING PLATE AND PROJECTION TYPE IMAGE DISPLAY DEVICE

(71) Applicant: Asahi Kasei E-materials Corporation, Tokyo (JP)

(72) Inventors: Yasuyuki Kawazu, Tokyo (JP); Takashi Ono, Tokyo (JP); Masaharu Sugimura, Tokyo (JP); Masaru Sugiyama, Tokyo (JP)

(73) Assignee: ASAHI KASEI E-MATERIALS CORPORATION, Tokyo (JP)

( * ) Notice: Subject to any disclaimer, the term of this patent is extended or adjusted under 35 U.S.C. 154(b) by 347 days.

(21) Appl. No.: 14/351,237

(22) PCT Filed: Oct. 12, 2012

(86) PCT No.: PCT/JP2012/076484
§ 371 (c)(1),
(2) Date: Apr. 11, 2014

(87) PCT Pub. No.: WO2013/054900
PCT Pub. Date: Apr. 18, 2013

(65) Prior Publication Data
US 2014/0293142 A1    Oct. 2, 2014

(30) Foreign Application Priority Data
Oct. 14, 2011   (JP) .................................. 2011-226736

(51) Int. Cl.
*G02F 1/1335* (2006.01)
*G03B 21/14* (2006.01)
(Continued)

(52) U.S. Cl.
CPC ..... *G02F 1/133536* (2013.01); *G02B 5/3058* (2013.01); *G03B 21/14* (2013.01);
(Continued)

(58) Field of Classification Search
CPC .................. G02F 2001/133548; G02B 5/3058
See application file for complete search history.

(56) References Cited

U.S. PATENT DOCUMENTS 7,894,019 B2 *   2/2011   Yamaki ............... G02B 5/3058
                                                                 349/96
2001/0053023 A1   12/2001   Kameno et al.

FOREIGN PATENT DOCUMENTS

JP    2001-330728 A    11/2001
JP    2005-172955 A     6/2005
(Continued)

OTHER PUBLICATIONS

Japanese Office Action issued in Japanese Application No. 2013-538595 dated Nov. 18, 2014.
(Continued)

*Primary Examiner* — Paisley L Arendt
(74) *Attorney, Agent, or Firm* — Birch, Stewart, Kolasch & Birch, LLP (57) ABSTRACT

A wire grid polarizing plate (10) has a substrate (11) having a concavo-convex structure extending in a particular direction on its surface, and a conductive material (12) provided to be distributed on one side surface (11b) of a convex portion (11a) of the concavo-convex structure. Further, in the wire grid polarizing plate (10), in a cross-sectional view in the perpendicular direction to the extension direction of the concavo-convex structure, a pitch P1 that is a distance between two adjacent convex portions (11a) is set at 120 nm or less, and a convex-portion height (H) that is a difference in height between a highest portion (11c) of the convex portion (11a) and a lowest portion (11e) of a concave portion (11d) is set at 0.8 time to 1.3 time the pitch P1. With the wire grid polarizing plate (10) in a liquid crystal display device, high image quality can be achieved.

9 Claims, 3 Drawing Sheets

(51) Int. Cl.
  *G02B 5/30* (2006.01)
  *G03B 21/20* (2006.01)
  *G03B 21/00* (2006.01)
(52) U.S. Cl.
  CPC .................. *G03B 21/2073* (2013.01); *G02F 2001/133548* (2013.01); *G03B 21/006* (2013.01)

(56) References Cited

FOREIGN PATENT DOCUMENTS

| | | |
|---|---|---|
| JP | 2006-84776 A | 3/2006 |
| JP | 2008-96677 A | 4/2008 |
| JP | 2008-256883 A | 10/2008 |
| JP | 2009-258168 A | 11/2009 |
| JP | 2009258168 A * | 11/2009 |
| JP | 2010-64346 A | 3/2010 |
| JP | 2010-85990 A | 4/2010 |
| JP | 2010-151850 A | 7/2010 |
| JP | 2010-211234 A | 9/2010 |
| JP | 2010-256553 A | 11/2010 |
| JP | 2011-22493 A | 2/2011 |
| JP | 2011-59370 A | 3/2011 |
| JP | 2011090141 A * | 5/2011 |
| JP | 2011-154303 A | 8/2011 |
| JP | 2011-192643 A | 9/2011 |
| JP | 2012-48225 A | 3/2012 |
| JP | 2012-108468 A | 6/2012 |

OTHER PUBLICATIONS

International Search Report, issued in PCT/JP2012/076484, dated, Jan. 15, 2013.
Japanese Office Action for Japanese Application No. 2013-538595, dated Jun. 23, 2015.
Korean Office Action for Korean Application No. 10-2014-7007902, dated Apr. 21, 2015.

* cited by examiner

WIRE GRID POLARIZING PLATE AND PROJECTION TYPE IMAGE DISPLAY DEVICE

TECHNICAL FIELD

The present invention relates to a wire grid polarizing plate and projection type image display device.

BACKGROUND ART

In recent years, such an occasion has increased that a reflection polarizer is used in a liquid crystal display device. The reflection polarizer reflects light of a particular linear polarization component, said transmits light of a component orthogonal to the particular linear polarization component. As the reflection polarizer, for example, there are a polarizer comprised of a layered product of birefringent resin, and a wire grid type polarizer in which a plurality of conductive materials (metal thin wires) extends parallel on a transparent substrate. Further, as a polarizer that reflects or transmits light of a particular circular polarization component instead of reflecting or transmitting light of a linear polarization component, there is also a polarizer comprised of cholesteric phase liquid crystal. Among the polarizers, as a reflection polarizer which has high polarization transmittance to enable light of a desired linear polarization component to be obtained, and is able to make light of a linear polarization component orthogonal to the desired linear polarization component low polarization transmittance (high polarization reflectance), the wire grid type polarizer receives attention. In addition, the ratio of transmittance between light of two actually orthogonal linear polarization components is referred to as an extinction ratio of transmitted light.

Generally, in the case where a pitch of metal thin wires is sufficiently smaller than a wavelength of incident light, among the incident light, the wire grid type polarizer has a property of transmitting light of a linear polarization component having an electric field vector orthogonal to an extension direction of the metal thin wires while reflecting light of a linear polarization component having an electric field vector in the extension direction of the metal thin wires.

As a method of preparing the wire grid type polarizer, such a method is known that a thin film made of a conductive material is prepared on a substrata surface, a polymer layer is formed on the thin film, then a pattern is formed on the polymer layer using a mold having a pattern prepared by an interference exposure method, electron beam lithography method or the like, and that metal thin wires are prepared by a dry etching method or the like on the thin film made of the conductive material using the pattern on the polymer layer (Patent Document 1). Further, such a method is also known that a conductive material is deposited on the side surface of a substrate convex portion on a concavo-convex-shaped substrate using an oblique deposition method (Patent Document 2). The former method needs an expensive manufacturing apparatus required for interference exposure, electron beam lithography, dry etching and the like and has the problem of low productivity. Meanwhile, the latter manufacturing method is capable of simplifying the process, thereby providing high productivity, making the contact area of the conductive material and the substrate convex portion large since the conductive material is deposited on the side surface of the substrate convex portion, and decreasing losses of the conductive material due to external forces or the like. Hereinafter, such a wire grid type polarizer is referred to as a wire grid polarizing plate.

The wire grid polarizing plate is a reflection polarizer allowing high polarization reflectance, thereby enables high luminance to be obtained by light recycling, and in the respect of little generation of heat generated from absorption of light, is suitable for liquid crystal display devices.

PRIOR ART DOCUMENT

Patent Document

[Patent Document 1] Japanese Unexamined Patent Publication No. 2006-084776
[Patent Document 2] Japanese Unexamined Patent Publication No. 2001-330728

DISCLOSURE OF INVENTION

Problems to be Solved by the Invention

In recent years, in the liquid crystal display device, with the progression of broadcast techniques and image techniques, higher image quality has been required. Therefore, the wire grid polarizing plate has also been required to contribute to the making of higher image quality.

The present invention was made in view of such a respect, and it is one object of the invention to provide a wire grid polarizing plate and projection type image display device that enable a liquid crystal display device of higher image quality to be provided.

Means for Solving the Problem

A wire grid polarizing plate of the present invention is a wire grid polarizing plate having a substrate having a concavo-convex structure extending in a particular direction on a surface thereof, and a conductive material provided to be distributed on one side surface of a convex portion of the concavo-convex structure, and is characterized in that a difference in parallel transmittance (Tp) between incident angles of −45 degrees and +45 degrees of light with a wavelength of 555 nm is 4% or less when a perpendicular direction of the wire grid polarization plate is set at 0 degree.

A wire grid polarizing plate of the invention is a wire grid polarizing plate having a substrate having a concavo-convex structure extending in a particular direction on a surface thereof, and a conductive material provided to be distributed on one side surface of a convex portion of the concavo-convex structure, and is characterized in that a pitch P1 that is a distance between two adjacent convex portions is 120 nm or less, and that a convex-portion height H that is a difference in height between a highest portion of the convex portion and a lowest portion of a concave portion ranges from 0.8 time to 1.3 time the pitch P1 in a cross section (hereinafter, also referred to as a cross-sectional view) perpendicular to an extension direction of the conductive material or the concavo-convex structure.

A projection type image display device of the invention is a projection type image display device having the wire grid polarizing plate as described previously, a light source, and a reflection liquid crystal display device, and is characterized in that light output from the light source passes through or is reflected by the wire grid polarizing plate to enter the reflection liquid crystal display device, and that light modulated by the reflection liquid crystal display device is reflected by or passes through the wire grid polarizing plate to project an image.

Advantageous Effect of the Invention

According to the present invention, it is possible to provide a liquid crystal display device with higher image quality.

BEST MODE FOR CARRYING OUT THE INVENTION

Embodiments of the present invention will be described below.

<Relationship between Optical Symmetry and Image Quality of a Wire Grid Polarizing Plate>

As a result of earnest studies to solve the above-mentioned problem, the inventors of the present invention found out that a wire grid polarizing plate shows high optical asymmetry caused by asymmetry of a structure comprised of conductive materials and substrate convex portions in a cross-sectional view, and since the asymmetry causes a change in the image state depending on the visual view angle, has a possibility of having an adverse effect on improvements in the image quality of a liquid crystal display device using the wire grid polarizing plate, and completed the present invention. In other words, the invention is as described below.

A wire grid polarizing plate of the present invention is a wire grid polarizing plate having a substrate having a concavo-convex structure extending in a particular direction on a surface thereof, and a conductive material provided to be distributed on one side surface of a convex portion of the concavo-convex structure, and is characterized in that a difference in parallel transmittance (Tp) between incident angles of −45 degrees and +45 degrees of light with a wavelength of 555 nm is 4% or less when a perpendicular direction of the wire grid polarization plate is set at 0 degree. In the case where the difference in parallel transmittance exceeds 4%, an observer is capable of recognizing a change in the image state, more specifically, brightness depending on the visual view angle, and therefore, such a case is unsuitable.

According to such a configuration, it is possible to use the wire grid polarizing plate of the invention suitably in a liquid crystal display device viewed in various directions.

Further, in identifying a specific structure of the wire grid polarizing plate of the invention having the above-mentioned characteristic, for example, the polarizing plate is a wire grid polarizing plate having a substrate having a concavo-convex structure extending in a particular direction on a surface thereof, and a conductive material provided to be distributed on one side surface of a convex portion of the concavo-convex structure, and is characterized in that a pitch P1 that is a distance between two adjacent convex portions is 120 nm or less, and that a convex-portion height H that is a difference in height between a highest portion of the convex portion and a lowest portion of a concave portion ranges from 0.8 time to 1.3 time the pitch P1 in a cross-sectional view in the perpendicular direction to the extension direction of the concavo-convex structure.

As image display devices to which the wire grid polarizing plate of the invention is applicable, for example, there are liquid crystal display devices and projection type image display devices that are transmission liquid crystal projectors, reflection liquid crystal projectors and the like.

Embodiments of the present invention will specifically be described below with reference to accompanying drawings.

<Wire Grid Polarizing Plate>

Figure 1:
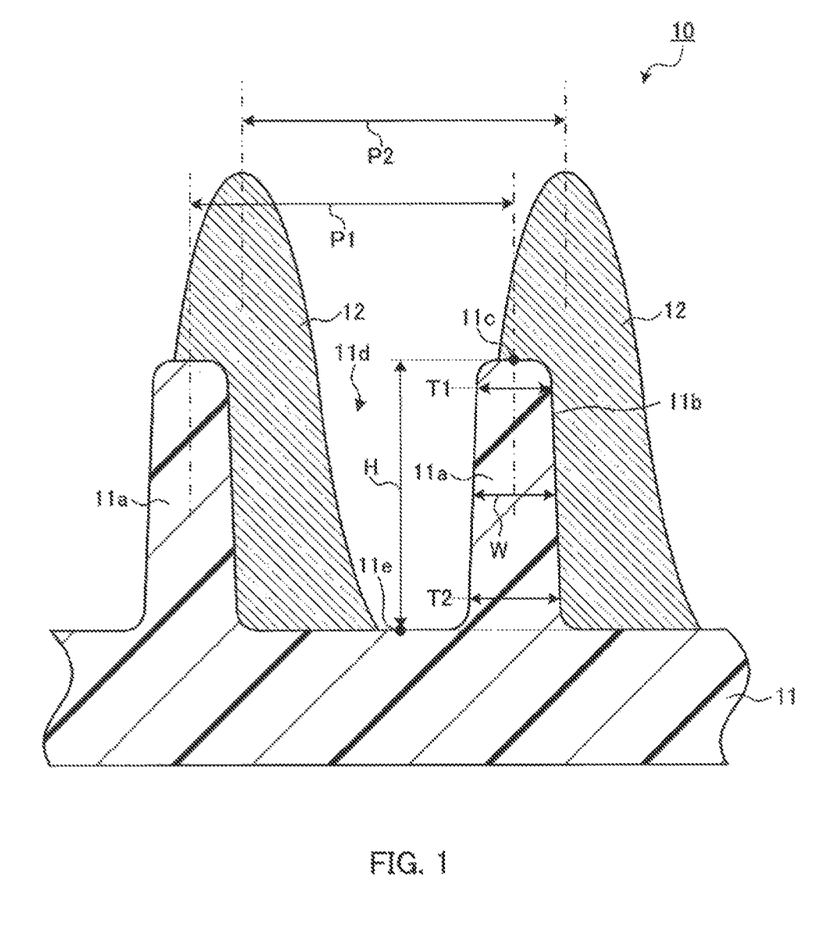
FIG. 1 is a cross-sectional schematic view showing an example of a wire grid polarizing plate according to this Embodiment.

FIG. 1 is a cross-sectional schematic view of a wire grid polarizing plate according to an Embodiment of the present invention. In addition, FIG. 1 shows a schematic view in the perpendicular cross section to the extension direction (depth direction of the paper surface in FIG. 1 in which convex portions and concave portions extend) of a concavo-convex structure of a substrate 11 of a wire grid polarizing plate 10.

As shown in FIG. 1, the wire grid polarizing plate 10 according to this Embodiment has the substrate 11 having the concave-convex structure extending in a particular direction on its surface, and conductive materials 12 provided to be distributed on one side of side surfaces 11 $b$ of a convex portion 11$a$ on the surface of the substrate 11. The concavo-convex structure of the substrate 11 is configured by a plurality of convex portions 11$a$ and a plurality of concave portions 11$d$ being repeated.

In the case where a pitch of the conductive materials 12 is sufficiently smaller than a wavelength of incident light, among the incident light, the wire grid type polarizing plate 10 has a property of transmitting light of a linear polarization component having an electric field vector orthogonal to the extension direction of the conductive materials 12 while reflecting light of a linear polarization component having an electric field vector in the extension direction of the conductive materials 12. In addition, transmittance of light of the linear polarization component having the electric field vector orthogonal to the extension direction of the conductive materials 12 is referred to as parallel transmittance, and transmittance of light of the linear polarization component having the electric field vector in the extension direction of the conductive materials 12 is referred to as orthogonal transmittance. In order to increase an extinction ratio of transmitted light expressed as a ratio of the parallel transmittance to the orthogonal transmittance, it is important to increase the parallel transmittance while decreasing the orthogonal transmittance.

A configuration of the concavo-convex structure of the wire grid polarizing plate 10 according to this Embodiment will specifically be described below. In addition, in the following description, in a cross-sectional view of the surface of the substrate 11, it is assumed that a distance between two adjacent convex portions 11$a$ is a pitch P1, and that a distance between conductive materials 12 distributed on one side (hereinafter, described as a "one side surface") of the side surfaces 11$b$ of the convex portion 11$a$ is a pitch P2. Further, it is assumed that a difference in height between a highest portion 11$c$ of the convex portion 11$a$ and a lowest portion 11$c$ of the concave portion 11$d$ is a convex-portion height H, and that a half width (full width at half maximum) of the convex portion 11$a$ of the concavo-convex structure is W.

In the cross-sectional view, the wire grid polarizing plate 10 according to this Embodiment has the substrate 11 having the concavo-convex structure extending in the particular direction on its surface, and conductive materials 12 provided to be distributed on one side surface of the convex portion 11a of the concavo-convex structure, and is configured so that the pitch P1 that is a distance between two adjacent convex portions 11a is 120 nm or less, and that the convex-portion height H that is a difference in height between the highest portion 11c of the convex, portion 11a and the lowest portion 11e of the concave portion 11d ranges front 0.8 time to 1.3 time the pitch P1. In the case of providing the conductive materials 12 to be distributed on one side surface 11b of the convex portion 11a of the concavo-convex structure, providing not to be distributed on the other side surface of the same convex portion 11a enables the parallel transmittance to be improved, and is preferable.

In the cross-sectional view, the conductive materials 12 of the wire grid polarizing plate 10 of the present invention are provided to he distributed on one side surface 11b of the convex portion 11a that is a non-opposed surface of two adjacent convex portions 11a, and therefore, the pitch P1 of the convex portions 11a and the pitch P2 of the conductive materials 12 are arranged with substantially the same distance. In the conductive materials 12 arranged with the minute pitch P2 of the order of nanometers, as the pitch P2 decreases, more excellent polarization properties are exhibited in a wide range of wavelengths. In the wire grid polarizing plate 10 according to this Embodiment, since the conductive materials 12 contact air (refractive index 1.0), by setting the pitch P2 of the conductive materials 12 at ¼ to ⅓ of incident light (visible light), it is possible to exhibit practically sufficient polarization properties. In addition, in consideration of optical symmetry, the pitch P1 is preferably set at 120 nm or less, and is more preferably set at 100 nm or less. Meanwhile, from the viewpoint of the shape of the conductive materials 12, the pitch P1 is preferably set at 80 nm or more. By this means, the conductive materials 12 are provided to extend from the substantially lowest portion to the highest portion of the concavo-convex structure, and further, it is made ease attaining the existence higher than the top portion of the convex portion 11a of the substrate 11.

Further, in the cross-sectional view, by setting the convex-portion height H at 0.8 time to 1.3 time the pitch P1, it is possible to facilitate preparation, of the wire grid polarizing plate 10 having the conductive materials 12 that extend in the perpendicular direction (convex-portion direction) and that are provided with the height giving the sufficiently high extinction ratio, and therefore, such setting is preferable. In the case of forming the conductive materials 12 using the oblique deposition method, depending on the shield effect of the convex portions 11a, the growth direction of the conductive material 12 is an oblique direction in the cross-sectional view, and way be coupled to the adjacent other conductive material 12. Coupling of conductive materials 12 in forming the conductive materials 12 results in decreases in the parallel transmittance. Particularly, when the pitch P1 is 120 nm or leas, a narrower pitch of two adjacent convex portions 11a causes conductive materials 12 to be coupled easily at the time of formation of the conductive material 12, and therefore, it is important to control the shield effect of the convex portions 11a.

Herein, by setting the convex-portion height H at 1.3 time the pitch P1 or less, it is possible to make the shield effect moderate at the time of formation of the conductive materials 12 by the oblique deposition method, and it is possible to grow the conductive materials 12 in the perpendicular direction. By this means, the conductive materials 12 are in the shape of extending in the perpendicular direction in the cross-sectional view, and it is thereby possible to prevent the transmittance from lowering due to coupling of adjacent conductive materials 12. Further, since the area of the convex portions 11a occupying between adjacent conductive materials 12 is sufficiently small, the shape of the conductive material 12 in the cross-sectional view is approximately bilaterally symmetric, and optical symmetry is high. Further, such an effect is produced that deceases in the area of the convex portion 11a occupying between adjacent conductive materials 12 associated with the setting the convex-portion height H at 1.3 time the pitch P1 or less contribute to improvements in the extinction ratio of reflected light.

In addition, when the convex-portion height H is excessively decreased, the ratio such that the height of the conductive materials 12 is high relative to the deposition amount is low. The height of the conductive materials 12 affects the extinction ratio of reflected light, and in order to prepare the wire grid polarizing plate 10 such that the height of the conductive materials 12 is sufficiently high with efficiency, it is preferable to set the convex-portion height H at 0.8 time the pitch P1 or more. In other words, in the cross-sectional view, by setting the convex-portion height H at 0.8 time to 1.3 time the pitch P1, it is possible to prepare the wire grid polarizing plate 10 with high optical symmetry and high extinction ratio of transmitted light.

Further, in the cross-sectional view, with respect to the convex-portion height H that is a difference in height between the highest portion of the convex portion 11a and the lowest portion of the concave portion 11d, when it is assumed that a position of substantially 9/10H is a first height position (T1), and that a position of substantially 1/10H is a second height position (T2), it is preferable that the width of the convex portion 11a in the first height position (T1) ranges from 0.5 time to 1.0 time the width of the convex portion 11a in the second height position (T2). In addition, the height position is set with reference to the bottom of the concave portion 11d. Further, the value of a half width of the convex portion 11a of the concavo-convex structure preferably ranges from 0.05 time to 0.5 time the pitch P1.

By setting the width of the convex portion 11a in the first height position (T1) at 0.5 time to 1.0 time the width of the convex portion 11a in the second height position (T2) and setting the value of a half width of the convex portion 11a at 0.05 time to 0.5 time the pitch P1, the convex portion 11a extends substantially in. the perpendicular direction from the bottom to the top, and is sufficiently thin as compared with the pitch P1. By this means, in the cross-sectional view, it is possible to effectively decrease the convex-portion area occupying between adjacent conductive materials 12, and it is thereby possible to obtain the wire grid polarizing plate 10 having high optical symmetry.

Further, it is preferable that the conductive material 12 extends from the substantially lowest portion 11e to the highest portion 11c of the concavo-convex structure, and that a part thereof is provided higher than the highest portion 11c of the convex portion 11a of the concavo-convex structure. By this means, it is possible to increase the height of the conductive material 12, and to increase the cross section area of the conductive material 12 in the cross-sectional view. In other words, with increases in the cross section area of the conductive material 12 in the cross-sectional view, the area of the convex portion 11a occupying between adjacent conductive materials 12 is relatively decreased, and not only contributing to improvements in optical symmetry, it is also possible to make the wire grid polarizing plate 10 with a high extinction ratio of reflected light. Moreover, since it is possible to increase the contact area of the convex portion 11*a* and the conductive material 12, it is possible to reduce removal peeling of the conductive material 12. In other words, such an effect is produced that it is possible to reduce losses of the conductive materials 12 due to external forces and the like.

Further, in the cross-sectional view, it is preferable that the cross-sectional shape of the convex portion 11*a* of the concavo-convex structure is substantially the shape of a rectangle. By this means, it is possible, to reduce the area of the convex portion 11*a* occupying between adjacent conductive materials 12.

Furthermore, in the cross-sectional view, it is preferable that the height from the highest portion 11*c* of the convex portion 11*a* to the highest portion of the conductive material 12 is 50 nm or more. By this means it is possible to increase the extinction ratio of transmitted light of the wire grid polarizing plate 10.

Still furthermore, in the cross-sectional view, it is preferable that the thickness in the horizontal direction of the conductive material 12 is 20 nm or more in between the first height position (T1 ) and the substantially highest portion 11*c* of the convex portion 11*a*. By this means, it is possible to increase the extinction ratios of transmitted light and reflected light of the wire grid polarizing plate 10.

Moreover, it is preferable that the width is 15 nm or more in the position (first height position (T1 )) of substantially 9/10H of the convex portion 11*a*. In order to actualize high parallel transmittance and high orthogonal reflectance suitable as a reflection polarizer, it is preferable to increase the thickness in the horizontal direction of the substantially highest portion lie of the conductive material 12. In the case of forming the conductive materials 12 by the oblique deposition method having excellent mass productivity, the cross-sectional shape of the conductive material 12 higher than the highest portion 11*c* of the convex portion 11*a* and the cross-sectional shape of the upper portion of the convex portion 11*a* tend to be similar shapes, and it is preferable to increase the thickness in the horizontal direction of the upper portion of the convex portion 11*a*.

(Substrate)

As the substrate 11, for example, it is possible to use inorganic materials such as glass and resin materials. Among the materials, forming the substrate 11 using the resin material has merits such as allowing roll process to be performed and being capable of providing the wire grid polarizing plate 10 with flexibility (bending property), and is thus preferable. Examples of the resins capable of being used as the substrate 11 are amorphous thermoplastic resins such as polymethylmethacrylate resin, polycarbonate resin, polystyrene resin, cycloolefin resin (COP), cross-linked polyethylene resin, polyvinyl chloride resin, polyacrylate resin, polyphenylene ether resin, modified polyphenylene ether resin, polyether imide resin, polyether sulfone resin, polysulfone resin and polyether ketone resin, crystalline thermoplastic resins such as polyethylene terephthalate (PET) resin, polyethylene naphthalate resin, polyethylene resin, polypropylene resin, polybutylene terephthalate resin, aromatic polyester resin, polyacetal resin, and polyamide resin, ultraviolet (UV) curable resins of acrylic system, epoxy system, urethane system and the like, and thermosetting resins. Further, it is possible to combine the UV-curable resin and thermosetting resin, inorganic substrate of glass or the like, the above-mentioned thermoplastic resin, and triacetate resin, or use alone to form the substrate 11. Furthermore, it is possible to provide the surface of the substrate 11 with a thin film to improve adhesion between the substrate 11 and the conductive material 12.

In the cross-sectional view, the concavo-convex structure on the surface of the substrate 11 is preferably in a rectangular shape. The rectangular shape is made of repetition of the concave portion 11*d* and convex portion 11*a,* and includes the shape of a trapezoid, the shape of a rectangle and the shape of a square. Further, it is also possible to have a curved portion such that the curvature changes gently like a parabola at the front and back of the inflection point in the case of regarding the outline of the concavo-convex structure in the cross-sectional view as a function, and it is possible to also include the shape that the convex portion 11*a* has a constriction. By the shape of the concavo-convex structure, it is made ease forming successive conductive materials 12, by the oblique deposition method, on side surfaces 11*b* of the convex portions 11*a* and bottoms of the concave portions 11*d* of the concavo-convex shape existing on the surface of the substrate 11.

Further, it is essential only that the substrate 11 is substantially transparent in an intended wavelength region. In addition, as extending in a predetermined direction, it is essential only chat the concave-convex structure substantially extends in the predetermined direction, and it is not necessary that each concave portion 11*d* and each convex portion 11*a* of the concavo-convex structure extend strictly parallel. Further, the pitch P1 of the concavo-convex structure is preferably 120 nm or less, and equal distances are preferable. In addition, as the equal distances, it is essential only that the pitches are substantially equal distances, and it is possible to permit variations within about ±10%. In the same manner as that variations in the pitch P1 of the concavo-convex structure are permitted in a predetermined range, the convex-portion height H, width of the convex portion 11*a* and the like in the cross-sectional view are also permitted in predetermined ranges (for example, up to variations within about ±10%).

A method of manufacturing the substrate 11 having the concavo-convex structure on the surface is not limited particularly. For example, it is possible to mention a manufacturing method as described in Japanese Patent Gazette No. 4147247 filed by the applicant of the present application. According to Japanese Patent Gazette No. 4147247, using a metal stamper having a concavo-convex structure prepared by an interference exposure method, the concavo-convex structure is thermally transferred to a thermoplastic resin, and free-end uniaxial drawing is applied in a direction parallel to the extension direction of the concavo-convex structure of the thermoplastic resin provided with the concave-convex structure. As a result, the pitch of the concavo-convex structure transferred to the thermoplastic resin is reduced, and it is possible to obtain a resin block (that is drawn) having a fine concavo-convex structure. From the resin block that is drawn), by using an electrolytic plating method or the like, it is possible to prepare a metal stamper having the fine concavo-convex structure. By using this metal stamper, the fine concavo-convex structure is transferred and formed onto the surface of the substrate 11, and it is thereby possible to obtain the substrate 11 having the concavo-convex structure.

Moreover, as the method of manufacturing the substrate 11 using a metal stamper, there are methods of using a silicon-based substrate with a fine concavo-convex structure prepared by application of photolithography techniques of semiconductor manufacturing and the like. A resin block having a fine concavo-convex structure on its surface is prepared using the silicon-based substrate having the fine concavo-convex structure as a mold. Next, from the obtained resin block having the fine concavo-convex structure on its surface, it is also possible to prepare a metal stamper having the fine concavo-convex structure using an electrolytic plating method or the like.

Herein, there is the case that variations are observed in applying visible light to the silicon-based substrate with the fine concavo-convex structure prepared by application of photolithography techniques of semiconductor manufacturing, or the like. As one of preparation methods of the concavo-convex structure on the surface of the above-mentioned silicon-based substrate or the like, it is possible to mention a method of sequentially transferring (exposing) so that a pattern of a reticle adjoins without a gap, and variations (hereinafter, also referred to as exposure variations) on the surface of the silicon-based substrate or the like prepared by the techniques as described previously are sometimes observed on the periphery of the boundary (joint) of adjacent exposure regions. The variations tend to occur particularly in preparing a concavo-convex structure in which the concavo-convex structure is aligned in one particular direction and the distance between adjacent convex portions 11a is 150 nm or less. To resolve the exposure variations, it is important to control the exposure position with high accuracy, and it is also possible to reduce or resolve, for example, by applying surface treatment such as reactive ion etching to a surface of a silicon-based substrate, or a surface having the concavo-convex structure obtained by transferring the concavo-convex structure of the silicon-based substrate.

The metal stamper as described previously is not limited in its external form, as long as it is possible to transfer and form a fine concavo-convex structure onto the surface of the substrate 11, and it is possible to adopt the shape of a plate, the shape of a cylinder or another shape. In consideration of mass productivity, the shape of a cylinder is preferable, and by this means, roll process for successively forming the concavo-convex shape is allowed by providing a block barrel with the metal stamper in the shape of a cylinder as a block material.

As a method of preparing a cylindrical metal stamper, for example, it is possible to mention techniques for rounding a plate-shaped metal stamper in the shape of a cylinder and joining end portions. Herein, when the surface of the joint portion is rough, in the substrate surface with a concavo-convex shape formed by roll process, the portion with the joint portion surface transferred thereto is a rough surface. The substrate with the concavo-convex shape formed is wound to be in the shape of a roll, and the substrate on the wind inner side and on the wind outer side where the rough portion overlaps is locally pressed strongly. In addition, it means a state in which rolling, concavity and convexity, and/or step exists that the surface of the joint portion is rough as described herein, and in the case of visually checking, means a state in which reflection is uneven (is not of a mirror surface) (due to roughness of the surface).

Since the concavo-convex structure of the wire grid polarizing plate according to the present invention has the pitch P1 of 120 nm or less, and is thus extremely fine, when the substrate in which the rough surface portion overlaps is locally pressed strongly, the concavo-convex structure becomes deformed, which may result in defects. In order to prevent such a disadvantage, it is possible to mention adjustment of winding pressure of a roll, use of an interleaf or interlayer material, adjustment of hardness of the substrate and the like, and particularly, it is preferable to polish the surface of the joint portion of the metal stamper in the shape of a cylinder. By smoothing the surface of the joint portion to be a mirror surface, it is possible to prevent the concave-convex structure from becoming deformed, and further, since adhesion between the substrate and the metal stamper improves in formation of the concavo-convex structure, it is possible to decrease the occurrence of defects.

(Conductive Material)

The conductive materials 12 are provided on the surface of the concavo-convex structure of the substrate 11. As described previously, it is preferable that the conductive material 12 contacts one side surface 11b of the convex portion. 11a, and is provided to extend from the substantially lowest portion 11e to the highest portion 11c of the concavo-convex structure, and further, it is preferable that at least a part of the conductive material 12 is provided higher than the highest portion 11c of the convex portion 11a of the concavo-convex structure.

The conductive materials 12 are formed linearly with the pitch P2 in substantially parallel no the convex portions 11a of the concavo-convex structure on the surface of the substrate 11 extending in the predetermined direction, and when the period of the linear conductive materials 12 is smaller than the wavelength of visible light, are a polarization, separation member for reflecting a polarization component vibrating in the parallel direction to the conductive materials 12, while transmitting a polarization component vibrating in the perpendicular direction. As the conductive materials 12, it is possible to use aluminium, silver, copper, platinum, gold or alloy having each of these metals as the main component, and it is possible to form by an oblique sputtering method or oblique deposition method. Particularly, forming the conductive materials 12 using aluminium or silver enables absorption losses of visible-region light to be decreased, and is preferable.

(Conductive Material Formation Method)

As a method of forming the conductive materials 12, in consideration of productivity, optical properties and the like, it is preferable to use the oblique deposition method for performing deposition from an inclined direction with respect to the perpendicular direction of the surface of the substrate 11 having the concavo-convex structure. The oblique deposition method is a method for depositing and stacking metal with a deposition source having a predetermined incident angle with respect to the perpendicular direction of the surface of the substrate 11 in a cross-sectional view of the substrate 11. The preferable range of the incident angle is determined from the cross-sectional shape of the convex portions 11a of the concavo-convex structure and conductive materials 12 to prepare. Generally, the range of 5 degrees to 45 degrees is preferable, and the range of 5 degrees to 35 degrees is more preferable. Further, in order to control the cross-sectional shape such as the height of the conductive materials 12, it is suitable to gradually decrease or increase the incident angle while considering a projection effect of stacked metal during deposition. In addition, when the surface of the substrate 11 is curved, deposition may be performed from an inclined direction with respect to the normal direction to the surface of the substrate 11.

Here specifically, the center of the deposition scarce is provided in the direction forming 5 degrees or more less than 45 degrees with, respect to the perpendicular direction in the center of the deposition-target region of the surface of the substrate 11 having, on its surface, the concavo-convex structure extending in a substantially parallel direction with the predetermined pitch P1 in a particular direction, and the conductive materials 12 are formed on the concavo-convex structure. More preferably, the center of the deposition source is provided in the angle direction forming 5 degrees or more less than 35 degrees with respect to the perpendicular direction in the center of the deposition-target region of the surface of the substrate 11. By this means, it is possible to selectively provide the conductive material 12 on one of side surfaces 11b of the convex portion 11a of the concavo-convex structure on the surface of the substrate 11. In addition, in the case of depositing while transporting the substrate 11, deposition may be performed so that the center of the deposition-target region at some instant and the center of the deposition source are on the above-mentioned condition.

In the case of using the oblique deposition method as described previously, the extension directions of the convex portions 11a and conductive materials 12 of the concavo-convex structure are equal. A metal deposition amount to attain the shape of the conductive materials 12 of the wire grid polarizing plate in this Embodiment is determined by the shape of the convex portions 11a of the concavo-convex structure, and generally, an average deposition, thickness ranges from about 50 nm to 200 nm. The average thickness described herein refers to a thickness of the deposited substance at the time of assuming that the substance is deposited on a smooth, glass substrate from the perpendicular direction to the glass surface, and is used as an index of the metal deposition amount.

Further, from the viewpoint of optical properties, it is preferable to remove unnecessary conductive materials 12 by etching. The etching method is sot particularly limited, as long as the method is an etching method that does not have an adverse effect on the substrate 11 and a dielectric layer described later and that enables portions of conductive materials 12 to be selectively removed. From the viewpoint of productivity and the viewpoint of shape control of the conductive materials 12, isotropic etching is preferable, and for example, an etching method for immersing in an alkali aqueous solution is preferable. Further, in the case of using isotropic etching, it is possible to reduce or resolve outward defects caused by exposure variations of the wire grid polarizing plate prepared from a silicon-based substrate having the exposure variations. Since the pitch P2 of the wire grid polarizing plate 10 in this Embodiment is small, the problem of exposure variations as described previously tends to occur in the case of using a silicon-based substrate, and therefore, it is extremely suitable to use isotropic etching enabling defects caused by exposure variations to be reduced or resolved.

(Dielectric)

In the wire grid polarizing plate 10 shown in this Embodiment, in order to improve adhesion between materials forming the substrate 11 and the conductive materials 12, it is possible to suitably use a dielectric layer including a dielectric material high in adhesion with both materials in therebetween to be comprised thereof. For example, it is possible to use oxides of silicon (Si) such as silicon dioxide, nitrides, halides, carbides alone or in combination thereof (dielectric obtained by mixing another element, a single substance or compound into a single substance of dielectric), and oxides, nitrides, halides and carbides of metal such as aluminium (Al), chromium (Cr), yttrium (Y), zirconium (Zr), tantalum (Ta), titanium (Ti), barium (Ba), indium (In), tin (Sn), sine (Zn), magnesium (Mg), calcium (Ca), cerium (Ce) and copper (Cu) alone or in combination thereof. As dielectric materials, it is essential only that the materials are substantially transparent in a wavelength region to obtain transparent polarization performance. A layering method of dielectric materials is not limited particularly, and for example, it is possible to suitably use a physical vapor deposition method such as a vacuum deposition method, sputtering method and ion plating method.

(Support Substrate)

As a substance to hold the substrate 11 having the concavo-convex structure, it is also possible to use a support substrate. As the support substrate, it is possible to use inorganic materials such as glass and resin materials, and it is preferable to use plate-shaped resin materials that enable the wire grid polarizing plate to be manufactured by roll process and that allow easy adhesion, to other optical members. Further, as a method for holding the substrate 11 by the support substrate, the method is not particularly limited, and it is possible to mention use of an adhesive substance, fusion by heating and the like.

As the resin materials, examples thereof axe polymethylmethacrylate resin (PMMA), polycarbonate resin, polystyrene resin, cycloolefin resin (COP), cross-linked polyethylene resin, polyvinyl chloride resin, polyacrylate resin, polyphenylene ether resin, modified polyphenylene ether resin, polyether imide resin, polyether sulfone resin, polysulfone resin, polyether ketone resin, polyethylene terephthalate resin (PET), polyethylene naphthalate resin, polyethylene resin, polypropylene resin, polybutylene terephthalate resin, aromatic polyester resin, polyacetal resin, polyamide resin, triacetylcellulose resin (TAC), ultraviolet (UV) curable resins of acrylic system, epoxy system, urethane system and the like, and thermosetting resins. Further, it is possible to combine the UV-curable resin and thermosetting resin, inorganic substrate of glass or the like, thermoplastic resin and the like, or use alone.

In order to avoids reduction in the polarization degree, as an in-plane phase difference of the support substrate, it is preferable to decrease the in-plane phase difference value at a predetermined wavelength, and for example, in considering use of visible light, it is preferable to set a phase difference value at a wavelength of 550 nm at 30 nm or less. Further preferably, the value is 15 nm or less. Moreover, in order to prevent the occurrence of in-plane variations in the polarization degree of polarization given by the wire grid polarizing plate 10, it is necessary to manage the phase difference value at two arbitrary points inside the surface of the support substrate, and for example, in considering use of visible light, the in-plane phase difference value at a wavelength of 550 nm is preferably 10 nm or less, and more preferably 5 nm or less. As support substrates having such characteristics, there are triacetylcellulose resin (TAC), cycloolefin polymer resin (COP), polycarbonate resin (PC), polymethylmethacrylate resin (PMMA) and the like, and it is preferable to use these resin materials.

(Protective Film)

It is possible to bond a protective film for preventing a loss and the like of the conductive materials 12 due to external forces in transportation to the surface having the conductive materials 12 of the wire grid polarizing plate 10 of this Embodiment. The protective film is comprised of an adhesive layer exhibiting adhesion properties and abase substrate. The adhesive layer is not limited, and for example, is capable of using an adhesion of acrylic system, silicone system, urethane system or the like. Further, the base substrate is not limited either, and for example, is capable of using a PET film or the like. Preferably, it is preferable that the adhesive layer and base substrate are both optically transparent. Being optically transparent means that transmittance is high at least in the visible light wavelength range, and by this means, it is made ease to observe a state of the bonded wire grid polarizing plate 10.

Herein, by thinning the thickness of the adhesive layer of the protective film, it is possible to prevent reductions in polarization separate properties such as a decrease in the parallel transmittance and an increase in the orthogonal transmittance of the wire grid polarizing plate 10. When the thickness of the adhesive layer of the protective film is thinned, elasticity of the adhesive layer is relatively small, adhesion with the conductive materials is poor, and therefore, it is possible to prevent the adhesive layer component from shifting to the conductive materials which decreases polarization separation properties. In addition, when the adhesive layer of the protective film is extremely thinned, since the adhesion force between the conductive materials 12 of the wire grid polarizing plate 10 and the adhesive layer excessively lowers, and therefore, the thickness of the adhesive layer preferably ranges from 2 μm to 10 μm.

<Reflection Liquid Crystal Projector>

A projection type image display device according to an Embodiment of the present invention will be described next. As a projector that is the projection type image display device according to this Embodiment, there is a reflection liquid crystal projector using a reflection liquid crystal display device, and as a polarization beam splitter of the reflection liquid crystal projector, it is possible to suitably use the wire grid polarizing plate 10 according to this Embodiment as described previously.

Figure 2:
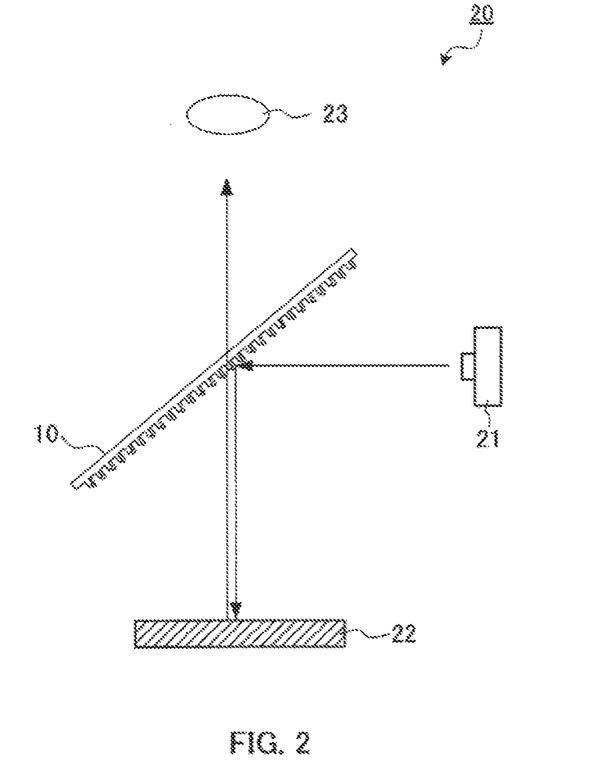
FIG. 2 is a conceptual diagram snowing an example of a projection type image display device according to this Embodiment.

The projection type image display device using the wire grid polarizing plate according to this Embodiment as described previously will be described with reference to FIG. 2. FIG. 2 is a conceptual diagram of a reflection liquid crystal projector that is an example ox the projection type image display device according to this Embodiment. As shown in FIG. 2, a reflection liquid crystal projector 20 according to this Embodiment is provided with a light source 21 such as an LED, wire grid polarizing plate 10 as a polarization beam splitter, and a reflection liquid crystal display device 22 that provides light-source light with image information. When necessary, the projector is capable of being provided with a projection lens 23 that enlarges and projects the image light provided with the image information.

The light-source light applied from the light source 21 is input to the wire grid polarizing plate 10 that is a polarization beam splitter. The species of light source is not limited particularly, and for example, it is possible to suitably use an LED, high-pressure mercury-vapor lamp, laser and the like. The polarized light which is subjected to polarization separation and reflected by the wire grid polarizing plate 10 is input to the reflection liquid crystal display device 22 to be modulated. The output light (image light) output from the reflection liquid crystal display device 22 is passed through the wire grid polarizing plate 10, enlarged by the projection lens 23, and then, is projected onto a screen.

Further, the wire grid polarizing plate 10 is preferably arranged so that the conductive-material structure surface with the conductive materials formed faces the reflection liquid crystal display device 22. This is because the surface on the side opposite to the conductive-material structure surface of the wire grid polarizing plate 10 is relatively low in reflectance and thereby allows reductions in unnecessary reflected light, i.e. reductions in stray light, and it is thus possible to improve the quality of projected image light.

In recent years, miniaturization has proceeded in the reflection liquid crystal projector, it is not possible to lengthen an optical path length between the light source and the polarization beam splitter, and such a case is increasing that the light-source light is input to the polarization beam splitter while being diffused light. As an optical system of the reflection liquid crystal projector, a pre-polarizing plate is sometimes disposed between the light source and the polarization beam splitter, and the transmission-axis directions of the polarization beam splitter and pre-polarizing plate are orthogonally disposed. However, in the case where the light-source light is diffused light, depending on the incident direction and incident angle of diffused light-source light, the transmission-axis directions are not orthogonal apparently, and cross at an obtuse angle. Herein, although image quality degrades when the extinction ratio of reflected light of the polarization beam splitter is low, the wire grid polarizing plate of the present invention enables the extinction ratio of reflected light to be increased, and is thereby capable of being used suitably. The extinction ratio of reflected light expressed as the ratio of the orthogonal reflectance to the parallel reflectance is preferably 50 or more, and more preferably, 90 or more. By using the wire grid polarizing plate having a high extinction ratio of reflected light as a polarization beam splitter, it is possible to provide the reflection liquid crystal projector of high image quality.

In addition, as the extinction ratio of transmitted light expressed as the ratio of the parallel transmittance to the orthogonal transmittance, from the viewpoint of contrast expression of an image, at a wavelength of 555 nm, at the transmittance of 85%, the ratio is preferably 3,000 or more, and more preferably, 4,000 or more. Further, at the transmittance of 88%, the ratio is preferably 800 or more, and more preferably, 1,000 or more.

The wire grid polarizing plate 10 according to this Embodiment is capable of being used while being bonded to a smooth glass flat plate or being curved. For example, in the case of bonding to a smooth glass flat plate, by making the size of the glass flat plate larger than the wire grid polarizing plate 10 to bond, it is possible to handle the bonded material of the wire grid polarizing plate 10 bonded to the smooth glass flat plate without contacting the end portion of the wire grid polarizing plate 10. Meanwhile, in the case of using as a polarization beam splitter, with consideration given to the effect of the Abbe number, using the plate 10 with the high Abbe number is preferable, and using the plate with a thin thickness is preferable. Moreover, it is also possible to provide the surface on the side opposite to the conductive-material structure surface with AR (Anti-Reflection) treatment or moth-eye treatment.

In addition, the wire grid polarizing plate 10 according to this Embodiment is capable of being used in the region of visible light, near-infrared light, and infrared light without loss of optical properties, and therefore, is preferably used in image display application using the region, pickup application, sensor application and the like. In addition, the plate 10 is not limited to this Embodiment as described previously, and is capable of being carried into practice with various modifications thereof. Further, the materials, the number and the like in this Embodiment as described previously are of one example, and are capable of being modified as appropriate. Furthermore, the plate 10 is capable of being carried into practice as appropriate within the scope of not departing from the technical idea of the present invention.

EXAMPLES

The present invention will specifically be descried below using Examples, hot the invention it not limited to the Examples. Described first are measurement methods of measurement values in the Examples.

<Measurement of Transmittance>

Used in measurement of transmittance was SETS-100 made by Otsuka Electronics Co., Ltd., or VAP-7070 made by JASCO Corporation. The RETS-100 is provided with a polarizer (hereinafter, also referred to as a measurement polarizer) near a light source and an analyzer (hereinafter, also referred to as a measurement analyzer) near a photo-detector, a measurement sample stage for holding a measurement sample has a uniaxial operation rotating shaft, and each is capable or being moved corresponding to a purpose of measurement. The VAP-7070 is provided with a measurement polarizer near a light source, and it is possible to perform, spectrometry while applying measurement light of linearly polarized light to a measurement sample.

<Measurement of Transmittance and Reflectance>

Used in measurement of transmittance and reflectance was U-4100 made by Hitachi High-Technologies Corporation. The U-4100 is provided with a measurement polarizer near a light source, a measurement sample stage for holding a measurement sample and photo-detector have the same uniaxial operation rotating shaft, and each is capable of being moved corresponding to a purpose of measurement.

<Measurement of In-Plane Phase Difference Value>

A polarization analysis apparatus (made by Oji Scientific Instruments, KOBRA-WR) using the parallel Nicol method was used as a measurement apparatus for in-plane phase difference value. The wavelength of measurement light was set at 550 nm, and a phase difference value in the case of an incident angle of 0 degree was regarded as an in-plane phase difference value.

<Measurement Method of Refractive Index>

Used in measurement of refractive index was a refractive index measurement apparatus (made by Metricon Corporation, Laser refractive index measurement model 2010). When measurement of curable resin was performed, the refractive index was measured after performing curing processing. From measurement results of refractive indexes at wavelengths of 532 nm, 633 nm and 824 nm by the refractive index measurement apparatus, a wavelength dispersion diagram of the refractive index was obtained using the Cauchy's dispersion equation, and the refractive index at a wavelength of 589 nm was obtained.

(Preparation Method of Wire Grid Polarizing Plate)

Next, preparation methods of wire grid polarizing plates used in the Examples will be described below.

(Preparation of Mold)

Silicon-based substrates 1 to 10, in which a concavo-convex structure extended in one direction and the pitch P1 of the concavo-convex structure in a cross-sectional view was 145 nm or 100 nm, were prepared by photolithography techniques. Among the substrates, the pitch P1 of the silicon-based substrate 1 was 145 nm, the pitches P1 of the silicon-based substrates 2 to 5 were set at 100 nm, and the pitches P1 of the silicon-based substrates 6 to 10 were set at 120 nm. As a height from, the highest portion of the convex portion to the lowest portion of the concave portion of the concavo-convex structure, the silicon-based substrate 1 was set for about 145 nm, the silicon-based substrate 2 was set for about 150 nm, the silicon-based substrate 3 was set for about 110 nm, the silicon-based substrate 4 was set for about 90 nm, the silicon-based substrate 5 was set for 125 nm, the silicon-based substrate 6 was set for 85 nm, the silicon-based substrate 7 was set for 110 nm, the silicon-based substrate 8 was set for 120 nm, the silicon-based, substrate 9 was set for 150 nm, and the silicon-based substrate 10 was set for 170 nm.

An acrylic-based UV-curable resin (refractive index 1.52) was applied onto a PET film (A-4300, made by Toyobo Co., Ltd.) in a thickness of about 3 μm, and each silicon-based substrate was overlapped so that the concavo-convex structure surface of each substrate contacted the UV-curable resin. Using a UV lamp with the center wavelength of 365 nm, UV irradiation of 1000 mJ/cm$^2$ was performed from one PET film side, and the concavo-convex structure of the silicon-based substrate was transferred onto the PET film. The surface of the PET film and the concavo-convex structure in the cross-sectional view were observed by SEM, and it was confirmed that the concavo-convex structure extended in one direction, end that the concavo-convex structure of the silicon-based substrate was transferred. In other words, the pitch of the transferred concavo-convex structure was the same pitch as the pitch P1. As conductive proceeding on the concavo-convex structure surface of the PET film as described previously, the concavo-convex structure was covered with platinum palladium by sputtering, then each was subjected to electroplating with nickel, and nickel stampers having the concavo-convex structure on their surface were prepared. In addition, it is assumed that the nickel stamper prepared from the silicon-based substrate 1 with the pitch P1 of 145 nm is a mold A, the nickel stampers prepared from the silicon-based substrates 2 to 5 with the pitch P1 of 100 nm are respectively molds B, D, E and F, and that nickel stampers prepared from the silicon-based substrates 6 to 10 with the pitch P1 of 120 nm are respectively molds G to K.

Using the prepared mold B, the concavo-convex structure was transferred to the surface of a cycloolefin resin (hereinafter, abbreviated as COP) plate with a thickness of 0.5 mm by a hot press method to prepare a COP plate B having the concavo-convex structure on its surface. Subsequently, surface treatment by UV-ozone was performed on the concavo-convex structure surface of the COP plate B with the concavo-convex structure on the mold B surface transferred thereto. Using an ultraviolet surface treatment apparatus (Photo Surface Processor, Model: PM906N-2, made by SEN LIGHTS Co., Ltd.), the surface having the concavo-convex, structure of the COP plate B was irradiated with UV with illuminance of 34 mW/cm$^2$ at a wavelength of 254 nm for 30 seconds. As the conductive processing on the surface-treated COP plate B, the concavo-convex structure was covered with platinum palladium by sputtering, and then, each was subjected to electroplating with nickel to prepare a nickel stamper. It is assumed that the nickel stamper prepared from the surface-treated COP plate B is a mold C.

(Preparation of Concavo-Convex Structure Transferred Film Using UV-Curable Resin)

Transferred films having the concavo-convex structure on their surface were prepared using the molds A to K as described previously. The substrate was a TAC film (TD80UL-H, made by FUJIFILM Corporation) made of triacetylcellulose-based resin with a thickness of 80 μm, and an in-plane phase difference value of the TAC film was 3.5 nm at a wavelength of 550 nm. An acrylic-based UV-curable resin (refractive index 1.52) was applied onto the TAC film in a thickness of about 3 μm, and the mold was stacked on the TAC film. Operating the UV lamp with the center wavelength of 365 nm, UV irradiation of 1000 mJ/cm$^2$ was performed from the TAC film side, and the concavo-convex structure of the mold was transferred onto the UV-curable resin. The TAC film was peeled off from the mold to prepare a transferred film with the concavo-convex structure transferred onto the substrate surface made of the UV-curable resin. Above-mentioned operation, was performed on each of the molds A to K to respectively prepare transferred films A to K as shown in Table 1 as described below. Table 1 shows results obtained by observing the surface of each transferred film and the concavo-convex structure in the cross-sectional view by SEM. In addition, in Table 1, the "pitch P1" is a distance (pitch) between two adjacent convex portions, the "convex-portion height H" is a difference in height between the highest portion of the convex portion and the lowest portion of the concave portion of the concavo-convex structure, and the "convex-portion width ratio (I)" is a value calculated by following relation equation (1).

Convex-portion width ratio=width of a convex portion in the first height position/width of the convex portion in the second height position   Eq. (1)

In Eq. (1), the first height position refers to a position of substantially 9/10H of the convex-portion height H that is a difference in height between the highest portion of the convex portion and the lowest portion of the concave portion in a cross-sectional view in the perpendicular direction to the extension direction of the concavo-convex structure, and the second height position refers to a position of substantially 1/10H.

was obtained by inserting a glass substrate with the smooth surface in the deposition apparatus together with each of the transferred films A to K and measuring the Al thickness on the deposited smooth glass substrate, refers to a thickness of the deposited substance in assuming that the substance is deposited on the smooth glass substrate from the perpendicular direction, and is used as an index of a deposition amount.

Examples 1 to 6 and Comparative Examples 1 to 5

(Removal of Unnecessary Al)

To remove unnecessary Al, the transferred films A to K with Al deposited were immersed in 0.1 weight % aqueous sodium hydroxide at room temperature, rinsed immediately after immersion and were dried to prepare wire grid polarizing plates A1 to K1 with the parallel transmittance of about 86%.

Figure 3:
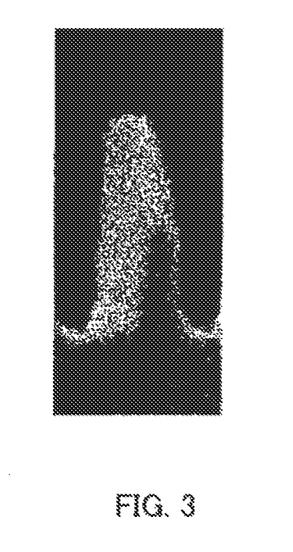
FIG. 3 is a SEM photograph in a cross-sectional view of the wire grid polarizing plate according to an Embodiment of the invention.

When the concavo-convex structure and the shape of conductive materials in the cross-sectional view of each of the wire grid polarizing plates A1 to K1 were observed by SEM, the conductive materials were distributed on one side surface of the convex portion of the concavo-convex structure on the substrate (see FIG. 3). Further, the conductive materials extended from the substantially lowest portion to

TABLE 1

| TRANSFERRED FILM | PITCH P1 | CONVEX-PORTION HEIGHT H | CONVEX-PORTION HALF WIDTH VALUE W | CONVEX-PORTION WIDTH RATIO(1) |
|---|---|---|---|---|
| A | 145 nm | 145 nm | 40 nm | 0.7 |
| B | 100 nm | 145 nm | 30 nm | 0.67 |
| C | 100 nm | 145 nm | 25 nm | 0.25 |
| D | 100 nm | 108 nm | 25 nm | 0.6 |
| E | 100 nm | 90 nm | 25 nm | 0.63 |
| F | 100 nm | 120 nm | 25 nm | 0.6 |
| G | 120 nm | 85 nm | 30 nm | 0.65 |
| H | 120 nm | 108 nm | 35 nm | 0.68 |
| I | 120 nm | 120 nm | 35 nm | 0.7 |
| J | 120 nm | 145 nm | 35 nm | 0.7 |
| K | 120 nm | 165 nm | 35 nm | 0.7 |

(Formation of Dielectric Layer Using a Sputtering Method)

Next, silicon dioxide was deposited on the substrate surface having the concavo-convex structure of each of the transferred films A to K as a dielectric layer by a sputtering method. On the sputtering apparatus conditions that Ar gas pressure was 0.2 Pa, sputtering power was 770 W/cm$^2$, and that the coating rate was 0.1 nm/s, deposition was performed so that the dielectric thickness on the transferred film was 3 nm in terms of flat film.

(Formation of Conductive Materials Using the Oblique Deposition Method)

Next aluminium (Al) was deposited on the substrate surface having the concavo-convex structure of each of the transferred films A to K by vacuum deposition. The Al vacuum deposition conditions were that at room temperature the degree of vacuum was $2.0 \times 10^{-3}$ Pa and that the deposition rate was 40 nm/s. In the cross-sectional view, in transferred films A, B, C, D and E, the deposition angle with respect to the perpendicular direction of the substrate was set at 18 degrees, and Al was deposited so that an Al average thickness was 110 nm. In addition, the Al average thickness the highest portion of the concavo-convex structure, and at least a part thereof were provided higher than the highest portion of the convex portion of the concavo-convex structure. The height from the highest portion of the convex portion to the highest portion of the conductive material was 50 nm or more.

Further, Table 2 shows the "convex-portion thickness (II)", "convex-portion shape", "conductive-material thickness (III)", and "conductive-material height (IV)" of each of the wire grid polarizing plates A1 to K1. The "convex-portion thickness (II)" is a width of the convex portion at the first height position, and the "convex-portion shape" means the shape of the concavo-convex structure in the cross-sectional view. Further, the "conductive-material thickness (III)" is a thickness in a portion in which the thickness in the horizontal direction of the conductive material is the thinnest between the first height portion and the substantially highest portion of the convex portion, and the "conductive-material height (IV)" means a height from the lowest portion to the highest portion of the conductive material.

TABLE 2

| WIRE GRID POLARIZING PLATE | CONVEX-PORTION THICKNESS (II) | CONVEX-PORTION SHAPE | CONDUCTIVE-MATERIAL THICKNESS (III) | CONDUCTIVE-MATERIAL HEIGHT (IV) |
| --- | --- | --- | --- | --- |
| A1 | 40 nm | RECTANGULAR SHAPE | 25 nm | 230 nm |
| B1 | 30 nm | RECTANGULAR SHAPE | 15 nm | 220 nm |
| C1 | 15 nm | SINE-WAVE SHAPE | 20 nm | 220 nm |
| D1 | 20 nm | RECTANGULAR SHAPE | 30 nm | 185 nm |
| E1 | 25 nm | RECTANGULAR SHAPE | 35 nm | 170 nm |
| F1 | 20 nm | RECTANGULAR SHAPE | 35 nm | 240 nm |
| G1 | 30 nm | RECTANGULAR SHAPE | 38 nm | 170 nm |
| H1 | 15 nm | RECTANGULAR SHAPE | 35 nm | 210 nm |
| I1 | 15 nm | RECTANGULAR SHAPE | 30 nm | 240 nm |
| J1 | 20 nm | RECTANGULAR SHAPE | 28 nm | 290 nm |
| K1 | 25 nm | RECTANGULAR SHAPE | 20 nm | 335 nm |

The parallel transmittance in inclined incidence of each of the wire grid polarizing plates A1 to K1 was measured by RETS-100 made by Otsuka Electronics Co., Ltd. The parallel transmittance was measured on the condition that the operation rotating shaft of the measurement sample stage and the transmission axis directions of the measurement polarizer, measurement photo-detector and each wire grid polarizing plate targeted for measurement were orthogonal. The incident angle of measurement light input to each of the wire grid polarizing plates A1 to K1 was set at −45 degrees and +45 degrees with the perpendicular direction of the wire grid polarizing plate regarded as 0 degree. Further, the measurement wavelength was set at 555 nm such that the human eye feels light strongly. An absolute value of $\Delta Tp_{(\lambda=550\ nm)}$ that is a difference in parallel transmittance $Tp_{(\lambda=550\ nm)}$ between incident angles of −45 degrees and +45 degrees was calculated from obtained measurement results of parallel transmittance. Table 3 shows calculated optical symmetry $|\Delta Tp_{(\lambda=550\ nm)}|$. In addition, small optical symmetry $|\Delta Tp_{(\lambda=550\ nm)}|$ results in high optical symmetry.

TABLE 3

| WIRE GRID POLARIZING PLATE | OPTICAL SYMMETRY |
| --- | --- |
| A1 (COMPARATIVE EXAMPLE 1) | 5.10% |
| B1 (COMPARATIVE EXAMPLE 2) | 4.40% |
| C1 (COMPARATIVE EXAMPLE 3) | 5.00% |
| D1 (EXAMPLE 1) | 2.40% |
| E1 (EXAMPLE 2) | 1.80% |
| F1 (EXAMPLE 3) | 2.90% |
| G1 (COMPARATIVE EXAMPLE 4) | 2.40% |
| H1 (EXAMPLE 4) | 2.50% |
| I1 (EXAMPLE 5) | 2.80% |
| J1 (EXAMPLE 6) | 3.20% |
| K1 (COMPARATIVE EXAMPLE 5) | 4.50% |

As shown in Table 3 as compared with Examples 1 to 6. Comparative Examples 1, 2, 3 and 5, the parallel transmittance difference between incident angles of −45 degrees and +45 degrees was large, and optical symmetry was low. The biggest difference between Comparative Example 1 and Examples 1, 2 and 4 was the pitch P1, and by decreasing the pitch P1, optical symmetry was improved. Further, in Comparative Examples 2, 3 and 5, the convex-portion height H was larger than 1.3 time the pitch P1, and in Comparative Example 3, the convex-portion width ratio (I) was smaller than 0.5 time the pitch P1. Accordingly, the convex-portion area occupying between adjacent conductive materials in the cross-sectional view was large, and optical symmetry lowered. Examples 1 to 6 of 1.3 time the pitch P1 or less resulted in high optical symmetry, and are capable of being used suitably.

Examples 7 to 3 and Comparative Examples 6 to 9

(Removal of Unnecessary Al)

A plurality of sheets of each of transferred films A, B, C, D, E, G and H with Al deposited was prepared to prepare respective wire grid polarizing plates with the immersion time in 0.1 weight % aqueous sodium hydroxide (at room temperature) varied. Operation of removal of unnecessary Al was the same except the immersion time, and rinsing and drying was performed immediately after immersion in the aqueous sodium hydroxide. In addition, in the obtained wire grid polarizing plates, it is assumed that the wire grid polarizing plates obtained from the transferred films A, B, C, D, E, G and H are respectively wire grid polarizing plates A2, B2, C2, D2, E2, G2 and H2.

Figure 4:
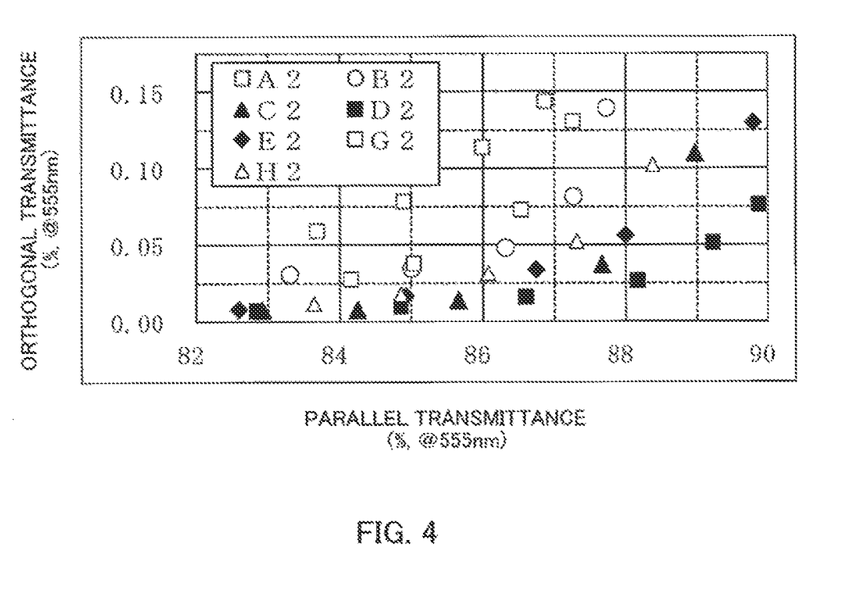
FIG. 4 is a graph showing the relationship between parallel transmittance and orthogonal transmittance of the wire grid polarizing plate according to the Embodiment of the invention.

Next, the parallel transmittance and orthogonal transmittance were measured with VAP-7070 made by JASCO Corporation in the case of applying measurement light from the perpendicular direction of each of the obtained wire grid polarizing plates A2, B2, C2, D2, E2, G2 and H2. The measurement wavelength was set at 555 nm such that the human eye feels light strongly, and obtained measurement results of the parallel transmittance and orthogonal transmittance are shown in the graph of FIG. 4. In addition, it is assumed that the wire grid polarizing plate A2 is Comparative Example 6, the wire grid polarizing plate B2 is Comparative Example 7, the wire grid polarizing plate C2 is Comparative Example 8, the wire grid polarizing plate D2 is Example 7, the wire grid polarizing plate E2 is Example 8, the wire grid polarizing plate G2 is Comparative Example 9, and that the wire grid polarizing plate H2 is Example 9.

As shown in FIG. 4, in the wire grid polarizing plate A2 (Comparative Example 6), since the pitch P1 was large, the orthogonal transmittance was high, and the extinction ratio of transmitted light was low. In the wire grid polarizing plates B2 (Comparative Example 7), C2 (Comparative Example 8), D2 (Example 7) and E2 (Example 8), the pitch P1 was 100 nm and thus small, but the wire grid polarizing plate B2 (Comparative Example 7) resulted in high orthogonal transmittance. This is because the convex-portion height H was high with respect to the pitch P1 and the conductive-material thickness (III) of the conductive materials formed by the oblique deposition method was thereby thinner than 20 nm. One of methods for thickening the conductive-material thickness (III) without changing the pitch P1 and convex-portion height H, there is the method (wire grid polarizing C2, Comparative Example 8) for making the convex-portion shape the sine-wave shape and thinning the thickness in the horizontal direction of the substantially highest portion of the convex portion, in which a reduction in optical symmetry occurs. Accordingly, it is preferable that the convex-portion height H is 1.3 time the pitch P1 or less.

In addition, as compared with the wire grid polarizing plate D2 (Example 7), the wire grid polarizing plate B2 (Example 8) resulted in high orthogonal transmittance. This is because the convex-portion height H was low and the height of the conductive materials formed by the oblique deposition method was thereby low. This is the same as in the G2 (Comparative Example 9) with respect to the wire grid polarizing plate H2 (Example 9). When the convex-portion height H is decreased, optical symmetry is higher, but high orthogonal transmittance is made. It is possible to solve the problem by controlling the deposition amount in deposition, but in consideration of the fact that an increase in the deposition amount results in a reduction in manufacturing efficiency and becomes a factor of high cost, it is preferable that the convex-portion height H is 0.8 time the pitch P1 or more.

(Extinction Ratio of Reflected Light)

The orthogonal reflectance and parallel reflectance were measured with the spectrophotometer (made by Hitachi High-Technologies Corporation, U-4100) in the case of applying measurement light to the conductive-material structure surface of each of the wire grid, polarizing plates C1 (Comparative Example 3), E1 (Example 2) and F1 (Example 3) with the pitch P1 of 100 nm. The operation rotating shaft of the measurement sample stage and the transmission axis direction of each wire grid polarizing plate targeted for measurement were parallel, and the operation rotating shaft of the measurement sample stage and the transmission axis direction of the polarizer near the light source of the measurement apparatus were orthogonal. The angle of measurement light applied to each wire grid polarizing plate was set at an inclination angle of 45 degrees with the perpendicular direction of the wire grid polarizing plate regarded as 0 degree, and the orthogonal reflectance and parallel reflectance of a wavelength of 555 nm at the incident angle were measured. The results are shown in Table 4. After measurement, when the ratio (extinction ratio of reflected light) of the orthogonal reflectance to the parallel reflectance was calculated, the wire grid polarizing plate C1 was of 19, the wire grid polarizing plate E1 was of 101, and the wire grid polarizing plate F1 was of 51.

TABLE 4

|  | ORTHOGONAL REFLECTANCE (%) | PARALLEL REFLECTANCE (%) | EXTINCTION RATIO OF REFLECTED LIGHT |
|---|---|---|---|
| WIRE GRID POLARIZING PLATE C1 (COMPARATIVE EXAMPLE 3) | 89.8 | 4.7 | 19 |
| WIRE GRID POLARIZING PLATE E1 (EXAMPLE 2) | 90.8 | 0.9 | 101 |
| WIRE GRID POLARIZING PLATE F1 (EXAMPLE 3) | 91.2 | 1.8 | 51 |

As shown in Table 4, in the wire grid polarizing plates E1 and F1 in the cross-sectional view, by making the convex-portion height H 1.3 time the pitch P1 or less, since the area of the convex portion occupying between adjacent conductive materials was sufficiently small, the extinction ratio of reflected light was increased.

Examples 10 to 12 and Comparative Example 10

(Optical Properties Before and After Bonding a Protective Film)

The surface of the wire grid polarizing plate E1 having the conductive materials was bonded to a protective film 1 or protective film 2 having an acrylic-based adhesive 1 (refractive index 1.47) on a PET film that was the base substrate and a protective film 3 or protective film 4 having a silicone-based adhesive 1 on a PET film that was the base substrate, and the parallel transmittance and orthogonal transmittance were measured before and after bonding the protective film. The protective films 1 and 2 were only different in the layer thickness of the acrylic-based adhesive 1, the layer thickness of the protective film 1 was 2.5 μm, and the layer thickness of the protective film 2 was 10 μm. Further, the protective films 3 and 4 were only different in the layer thickness of the silicone-based adhesive 1, the layer thickness of the protective film 3 was 10 μm, and the layer thickness of the protective film 4 was 20 μm. In addition, VAP-7070 made by JASCO Corporation was used in optical measurement.

It was assumed that the ease of using the protective film 1 is Example 10, the case of using the protective film 2 is Example 11, the case of using the protective film 3 is Example 12, and that the case of using the protective film 4 is Comparative Example 10.

Before bonding the protective film, the parallel transmittance Tp1 and orthogonal transmittance Tc1 of the wire grid polarizing plate E1 were measured at a wavelength of 555 nm. Subsequently, the protective film was bonded, the bonded protective film was peeled off after letting stand at room temperature for 30 minutes, and the parallel transmittance Tp2 and orthogonal transmittance Tc2 of the wire grid polarizing plate E1 were measured at the wavelength of 555 nm. From Tp1, Tp2, Tc1 and Tc2, ΔTp and ΔTc were calculated using following equation (2). In addition, as ΔTp is smaller, it is meant that reductions in optical properties of the wire grid polarizing plate due to the protective film are fewer.

$$\Delta Tp = |Tp1 - Tp2|$$

$$\Delta Tc = |Tc1 - Tc2| \quad \text{Eq. (2)}$$

TABLE 5

| | ADHESIVE | ΔTp | ΔTc |
|---|---|---|---|
| PROTECTIVE FILM 1 (EXAMPLE 10) | ACRYLIC-BASED | 0.32 | <0.001 |
| PROTECTIVE FILM 2 (EXAMPLE 11) | ACRYLIC-BASED | 0.39 | 0.003 |
| PROTECTIVE FILM 3 (EXAMPLE 12) | SILICONE-BASED | 2.9 | 0.08 |
| PROTECTIVE FILM 4 (COMPARATIVE EXAMPLE 10) | SILICONE-BASED | 8.7 | 0.096 |

As shown in Table 5, as compared with Comparative Example 10, reductions in optical properties in Example 12 were few. By thinning the thickness of the adhesive layer, it was possible to prevent reductions in polarization separation properties such as changes in the parallel transmittance and orthogonal transmittance of the wire grid polarizing plate E1.

In addition, in comparison between Example 10 and Example 11, in terms of optical properties. Example 9 with the thin adhesive-layer thickness is preferable, but it is hard to say that adhesion between the wire grid polarizing plate E1 and the rescue tire materials is good, and the frequency of mixing of air in bonding increased. This is because adhesion between the wire grid polarizing plate and the conductive materials lowered excessively. Accordingly, it is preferable that the thickness of the adhesive layer ranges from 2 μm to 10 μm.

In addition, the present invention is not limited to the above-mentioned Embodiments, and is capable of being carried into practice with various modifications thereof. In the above-mentioned Embodiments, the sizes, shapes and the like shown in the accompanying drawings are not limited thereto, and are capable of being modified as appropriate within the scope of exhibiting the effects of the invention. Moreover, the invention is capable of being carried into practice with modifications thereof as appropriate without departing from the scope of the object of the invention.

INDUSTRIAL APPLICABILITY

According to the present invention, the wire grid polarizing plates are excellent in optical symmetry, and are capable of being used in actualizing a liquid crystal display device of high image quality.

The present application is based on Japanese Patent Application No. 2011-226736 filed on Oct. 14, 2011. The entire content thereof and entire content of Japanese Patent Gazette No. 4147247 cited in the present description are expressly incorporated by reference herein.

The invention claimed is:

1. A wire grid polarizing plate comprising:
   a substrate having a concavo-convex structure extending in a particular direction on a surface thereof; and
   a conductive material provided to be distributed on one side surface of convex portions of the concavo-convex structure,
   wherein in a cross-sectional view in a perpendicular direction to an extension direction of the concavo-convex structure, a pitch P1 that is a distance between two adjacent convex portions is 120 nm or less, and a convex-portion height H that is a difference in height between a highest portion of the convex portions and a lowest portion of concave portions of the concavo-convex structure ranges from 0.8 times to 1.3 times the pitch P1,
   wherein in the cross-sectional view in the perpendicular direction to the extension direction of the concavo-convex structure, with respect to the convex-portion height H that is a difference in height between the highest portion of the convex portions and the lowest portion of the concave portions, when a position of 9/10H is a first height position, and a position of 1/10H is a second height position, a width of the convex portions in the first height position ranges from 0.5 times to 1.0 times the width of the convex portions in the second height position, and a value of a half width of the convex portions of the concavo-convex structure ranges from 0.05 times to 0.5 times the pitch P1, and
   wherein the conductive material extends from a lowest portion to a highest portion of the concavo-convex structure, and at least a part of the conductive material is provided higher than the highest portion of the convex portions of the concavo-convex structure.

2. The wire grid polarizing plate according to claim 1, wherein in the cross-sectional view in the perpendicular direction to the extension direction of the concavo-convex structure, a cross-sectional shape of the convex portions of the concavo-convex structure is a substantially rectangular shape.

3. The wire grid polarizing plate according to claim 1, wherein in the cross-sectional view in the perpendicular direction to the extension direction of the concavo-convex structure, a height from a highest portion of the convex portions to a highest portion of the conductive material is 50 nm or more.

4. The wire grid polarizing plate according to claim 1, wherein in the cross-sectional view in the perpendicular direction to the extension direction of the concavo-convex structure, the conductive material has a thickness of 20 nm or more in between the first height position of substantially 9/10H of the convex portions and a substantially highest portion of the convex portion.

5. The wire grid polarizing plate according to claim 1, wherein in the cross-sectional view in the perpendicular direction to the extension direction of the concavo-convex structure, the width in the first height position of substantially 9/10H of the convex portions is 15 nm or more.

6. The wire grid polarizing plate according to claim 1, wherein the conductive material is etched by isotropic etching.

7. The wire grid polarizing plate according to claim 1, wherein the concavo-convex structure is transferred and prepared using a silicon-based substrate having a concavo-convex structure on a surface thereof as an original plate.

8. The wire grid polarizing plate according to claim 1, further having:

a protective film to protect the conductive material, wherein a thickness of an adhesive layer of the protective film ranges from 2 μm to 10 μm.

9. A projection type image display device comprising:

the wire grid polarizing plate according to claim 1;

a light source; and a reflection-type liquid crystal display device, wherein light output from the light source passes through or is reflected by the wire grid polarizing plate to enter the reflection-type liquid crystal display device, and the light modulated by the reflection-type liquid crystal display device is reflected by or passes through the wire grid polarizing plate to project an image.

* * * * *